United States Patent [19]

Oguma et al.

[11] 4,368,170

[45] Jan. 11, 1983

[54] METHOD OF OPERATING NUCLEAR REACTORS

[75] Inventors: Masaomi Oguma; Masao Ishida, both of Hitachi, Japan

[73] Assignee: Hitachi, Ltd., Tokyo, Japan

[21] Appl. No.: 883,588

[22] Filed: Mar. 6, 1978

[30] Foreign Application Priority Data

Mar. 4, 1977 [JP] Japan ................................ 52/22616

[51] Int. Cl.³ ............................................. G21C 7/36
[52] U.S. Cl. .................................... 376/216; 376/219; 376/450
[58] Field of Search ............ 176/19 R, 19 LD, 20 R, 176/21, 22, 24, 38, 50; 376/216, 219, 450

[56] References Cited

U.S. PATENT DOCUMENTS 4,057,466  11/1977  Thompson ..................... 176/19 R
4,080,251   3/1978  Musick .............................. 176/24

*Primary Examiner*—Donald P. Walsh
*Attorney, Agent, or Firm*—Antonelli, Terry and Wands

[57] ABSTRACT

In a nuclear reactor comprising control rods, nuclear fuel elements each having a cladding and pellets inserted therein, and a recirculation system, the reactor raises its power at least once by withdrawal of the control rods above a pellet-cladding interaction starting power (kw/ft) of the fuel element in a burnup range below the burnup at which the maximum pellet-cladding interaction starting power appears.

6 Claims, 4 Drawing Figures

METHOD OF OPERATING NUCLEAR REACTORS

BACKGROUND OF THE INVENTION

This invention relates to a method of operation of a nuclear reactor which is provided with nuclear fuel elements inserted in its core, control rods and a mechanism for controlling the power of the reactor by neutron moderator, neutron absorber, neutron reflector etc. arranged in the core or its surrounding, particularly to a method of operating the nuclear reactor for raising load following performance of the nuclear reactor without failure or damage risk of the nuclear fuel elements.

Nuclear reactors which can follow a load increasing or decreasing in accordance to electric power demand changing between working days and holidays, days and nights are in great need. Conditions under which the fuel elements are used during the load following operation are very severe, compared with ones when operated under a rated power for a long time. Therefore, at the present day the reactors are under the severe operating conditions. One of the nuclear reactors, a boiling water reactor (referred to BWR hereinafter) which is now in practice is not exceptional.

Fuel elements for the BWR each usually comprise pellets which each are about 10 mm in its height and stacked in a column and a cladding of about 4 m in its length and about 11 mm in its inner diameter which contains therein the stacked pellets, and is sealed at both ends. The diameter of the pellets and the inner diameter of the cladding are controlled precisely so that a constant diameteral gap is made between the pellets and and cladding. Usually, the gap is determined to be such a size (several 10 $\mu$m to several 100 $\mu$m) that thermal expansion of the pellets can be absorbed well enough. Therefore, if the pellets are subjected only to the thermal expansion, pellet-cladding interaction (hereinafter referred to PCI) does not occur. Much experimental data, however, show that PCI occurs from a power much lower than a rated power even if the fuel element is designed and manufactured thus.

PCI occurs as follows. The fuel element as inserted in the core has a constant diametral gap between the cladding and the pellets. When the power of the fuel element is increased, a great temperature gradient (2000°-3000° C./cm) is produced in the pellet to induce great thermal stress. The pellet is broken into small pieces by the thermal stress. By thermal elastic energy relieved then, the small pieces of the pellet are moved toward the cladding. This breakage occurs at small linear heat generation rate of 2 to 3 kw/ft. In this stage, the small pieces of the pellet have sufficient freedom so that if their movements are limited by the cladding, they may be restored while being mutually displaced. Therefore, stress which the cladding sustains from the pieces of the pellet is very small.

As the power of the reactor is further increased, the breakage of the pellet progresses further, an amount of thermal expansion of the pellet increases so that the pieces of the pellet are radially pushed away. As a result, the pieces of the pellet are meshed with each other not to be shifted. Thus, the pieces of the pellet and the cladding are brought into very hard contact, and strong stress is applied to each other. It is thought that the PCI thus occurs. The linear heat generation rate at this time is called PCI starting power.

In a range above the PCI starting power, when the power of the reactor is rapidly increased, an amount of movement of the pieces of the pellet to the cladding due to rapid thermal expansion becomes strain of the cladding so that the cladding is forced to deform with a large strain speed and a large strain amount. If the power increase is slowly carried out, however, the pellet creeps by restraint force of the cladding during the slow increase of the power so that the pieces of the pellet as a whole are restored to the central portion. Stress induced in the pellet at this time is small as compared with one induced during the rapid power increase. Thus, it is said that in a linear heat generation rate above the PCI starting power, the larger the power increase speed becomes, generally the higher probability of breakage of the cladding becomes.

If the cladding is broken, fission products with strong radioactivity produced in the pellet are released into coolant. In this case, it may become difficult to continue operation of the reactor.

In order to avoid this risk, a conventional method of operating BWR which is carried out hitherto is described hereinafter. According to the method, until a linear heat generation rate of the fuel element reaches $P_1 = 8$ kw/ft which is described for example in U.S. Pat. No. 4,057,466, power increase of the reactor is effected by control rods at a speed almost unlimited. When the power is raised above $P_1$, it is done slowly by controlling the quantity of flow of recirculating coolant at a speed of below $P_2 = 0.06$ kw/ft/hr. When power of the reactor reaches a rated power (kw/ft), the rated power is held constant for 12 hours. This operation pattern is called a preconditioning operation. After this preconditioning operation, below the rated power, it is possible to increase or decrease the power somewhat at any speed. Even during the time, above the linear heat generation rate of 8 kw/ft, power increase by withdrawal of control rods is forbidden. Further, it is necessary to effect the preconditioning operation when part of the fuel elements used is exchanged for new one, or a pattern of the control rods is changed.

A control rod drive mechanism of the BWR adopts a notch type drive mechanism which pull out the control rods one by one, and withdraws in an instant by one notch (about 20 cm) every time. When the control rods are fully inserted in the core, the power of the reactor is depressed to a low power. As the control rod is withdrawn by one notch, the power increases by a value corresponding to the amount of the withdrawal of the control rod. At this time, in a low portion of the control rod, the fuel element raises power at a very high rate of 2 to 6 kw/ft/hour.

On the other hand, the power of the reactor is raised by controlling the quantity of flow of the coolant. Namely it is carried out by increasing moderation of neutrons by decreasing an amount of void ratio in the coolant which is increased by controlling the quantity of flow of the coolant. The decrease of the void ratio occurs evenly in the core, so that no partial increase of the linear heat generation rate comes about. The quantity of flow of the coolant can be regulated continuously. Therefore, very moderate power increase can be effected.

In BWR, in order to effect uniform burnup of the fuel element in the core, it is necessary to change an insertion patern of the control rods every fixed period. According to the above-mentioned method, the preconditioning operation must be carried out every the change of the insertion partern. For the preconditioning operation, one to three weeks are needed. Therefore, for this period, the reactor is impossible to effect operation to load following. Namely, for this period, the reactor can not be operated according to the electric power demand.

Accordingly, improvements on the operation method of the reactor is desired.

SUMMARY OF THE INVENTION

An object of the invention is to provide a method of operating a nuclear reactor which is excellent in load following.

Another object of the invention is to provide a method of operating a nuclear reactor in which power control range by control rods is able to be extended without increasing failure risk of fuel elements.

Briefly stated, a feature of the invention is that a nuclear reactor raises its power at least once by withdrawal of control rods to above a pellet-cladding interaction starting power (kw/ft) of fuel elements used therein in a burnup range below the burnup at which the maximum pellet-cladding interaction starting power appears.

DESCRIPTION OF THE PREFERRED EMBODIMENT

First, an experiment on which the invention is based, will be described hereinafter. The experiment is carried out using a plurality of nuclear fuel elements each comprising a cladding and pellets stacked in the cladding and produced according to conventional design specification except that diametral gaps between the cladding and the pellets are selected to 0.1 mm, 0.2 mm and 0.3 mm. Namely the cladding is 12.4 mm and 14.4 mm in its inner and outer diameters respectively and made of Zircaloy-2 which is recrystalized and annealed. The pellets are made of sintered $UO_2$ of theoretical density 95%. The plurality of nuclear fuel elements each of which is provided with a strain detector for the cladding are inserted in an experimental reactor to irradiate therein. During an operation of the reactor a length of the cladding was continuously measured by the detector while being cyclicly increased and decreased in its power. When pellet-cladding interaction (hereinafter referred to PCI) took place with its power increasing, the PCI appears as change of the cladding length, whereby a power or linear heat generation rate at the time that the PCI takes place, that is PCI starting power is found out. The results are shown in FIG. 1, wherein the result of the diametral gap 0.3 is shown by A, 0.2 by D and 0.1 by C.

Hitherto, in an operation of a nuclear reactor the maximum linear heat generation rate to which the reactor power can be raised by withdrawal of control rods is fixed to 8 kw/ft, namely the PCI starting power is considered to be 8 kw/ft, constant regardless of burnup of the fuel element changing.

Figure 1:
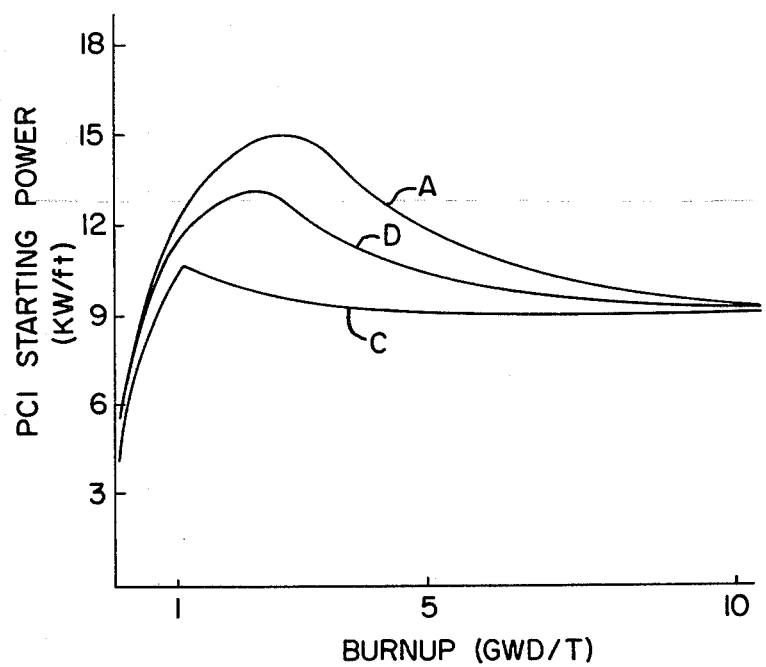
FIG. 1 is a graph showing a relation between PCI starting power and burnup of a fuel element.

According to the experimental results in FIG. 1, however it is noted that the PCI starting power changes according to the burnup of the fuel element. All of the fuel elements have the same characteristics with respect to the PCI starting power in that the PCI starting power increases in a initial stage of the burnup toward the maximum PCI starting power, and it decreases in a stage beyond the burnup corresponding to the maximum PCI starting power. It is noted that the larger the diametral gap between the cladding and the pellets is, the larger the PCI starting power changes and its value are.

From the experimental results, it is apparent that the upper limit of the linear heat generation rate at which the reactor can raise its power by the withdrawal of the control rods is effectively extended when it is selected according to the burnup of the fuel element. Further, the PCI starting power changes according to not only the burnup, but the diametral gap, therefore the upper limit of the linear heat generation rate at which the control rods can be withdrawn to raise the reactor power can be raised by employing the PCI starting power changing in accordance to the burnup and the diametral gap.

Figure 2:
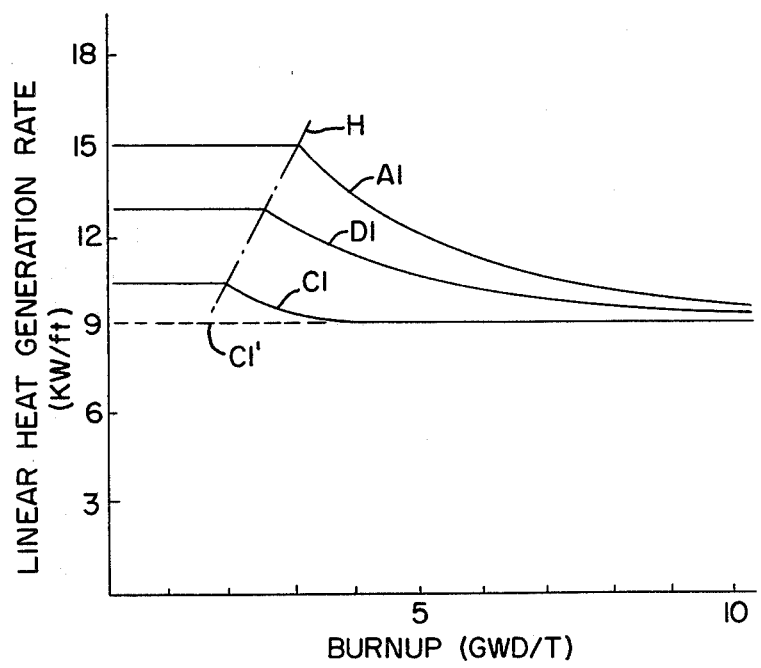
FIG. 2 is a graph showing a linear heat generation rate of a fuel element to which a reactor can raise its power by withdrawal of control rods, according to the invention.

When the upper limit of the linear heat generation rate is equal to or lower than the PCI starting power, the cladding is not stressed by the pellets when the power is raised by the withdrawal of the control rod. In order to further extend a range of the reactor power increased by the withdrawal of the control rods, only in an initial stage of irradiation of the fuel element in which the linear heat generation rate increases as the burnup progresses, the upper limit of the linear heat generation rate wherein the reactor power increase can be effected by operation of the control rods is determined in FIG. 2, that is it is determined to be constant value which is the maximum PCI starting power. In FIG. 2, characteristic curves A1, D1, and C1 show the upper limits of the linear heat generation rates in the diametral gaps 0.3 mm, 0.2 mm and 0.1 mm, respectively. A line H is a locus along which the maximum linear heat generation rate changes according to the diametral gap. In case of the diametral gap being small such as 0.1 mm, strong PCI may occur. Therefore, in an operation for more salty, the upper limit of the linear heat generation rate is made constant as shown by C1'.

Thus, by making the maximum linear power generation rate for withdrawal of the control rods higher than the PCI starting power, a strong PCI occurs, but the strong PCI occurence is limited only to the initial irradiation stage. In the initial period of the irradiation, brittleness is not developed in the cladding as yet, because corrosive fission products which seems to be a cause of the fuel element damage or failure due to low stress are produced to slight extent. Therefore, if the stress developed in the fuel element is within the elastic region of the fuel element, the damage does not occure. It is confirmed experimentally that the stress generated by the PCI is within the elastic region of the fuel element.

The linear heat generation rate of the fuel element to which the reactor can raise its power by the withdrawal of the control rods can be given by the equation. The burnup $B_0$ (GWD/T) at which the PCI starting power comes to be maximum is denoted as follows;

$$B_0 = -25G^2 + 17.5G \qquad (1)$$

wherein G(mm) is the diametral gap between the cladding and pellets. When the burnup is in a range of 0 to $B_0$, the upper limit $P_0$kw/ft of the linear heat generation rate at which the reactor power is raised by the withdrawal of the control rods is given as follows;

$$P_0 = -100G^2 + 70G + 3 \tag{2}$$

Figure 4:
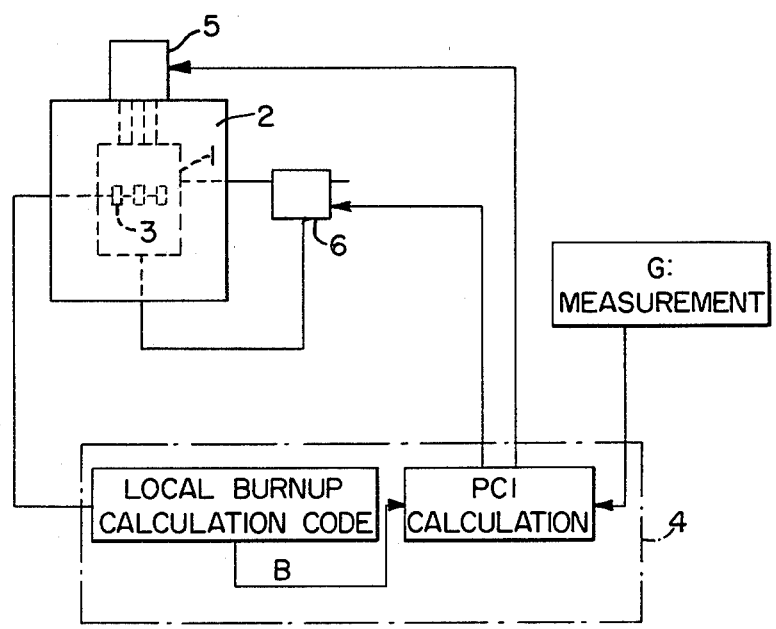
FIG. 4 is a diagrammatical view of a reactor according to the invention.

Referring to FIG. 4, $B_0 = 3 GWD/T$, $P_0 = 15$ kw/ft; $B_0 = 2.5$ $GWD/T$, $P_0 = 13$ kw/ft are readable on the characteristic curves A and D, respectively, which is fit to the above equations (1) and (2).

In a range beyond the burnup $B_0$, the upper limit P(kw/ft) of the linear heat generation rate at which reactor power increase can be effected by withdrawing the control rods is given as follows, using $B_0$ and $P_0$;

$$P = 9 + (P_0 - 9) \exp\{-0.4 \times (B - B_0)\} \tag{3}$$

wherein B(GWD/T) is the burnup of the fuel element. P changes according to the equation (3), with B changing.

Next, an embodiment of the present invention will be described hereinafter referring to FIG. 4. When the fuel elements are manufactured, the diametral gaps G between the cladding and pellets each are measured or inspected. The fuel elements are inserted in the core 1 of the reactor 2. Upon operation of the reactor 2, the fuel elements are burnt. The burnup of some of the fuel elements is detected by detectors 3 while the fuel elements are burnt. Based on the data, the burnup B of the fuel elements are calculated using a local burnup calculating code of the reactor with a computor 4. By knowing G and B, the previously mentioned $B_0$, $P_0$ and P is calculated according to the equations (1), (2) and (3).

It is preferable that, at least once, the reactor raise its power above the PCI starting power in an irradiation stage in which large ductility of the fuel element is maintained because a plurality of pieces of pellets broken by thermal stress are pushed by the cladding to displace to the central portion of the cladding and become molten to adhere to each other by high power whereby the whole pieces of the pellets can be stabilized. This operation is effective in the subsequent operation of raising the PCI starting power.

Thus, the linear heat generation rate that the reactor can raise its power by the withdrawal of the control rods is determined to make an instruction to a control rod drive means 5 for the withdrawal of the control rods.

Figure 3:
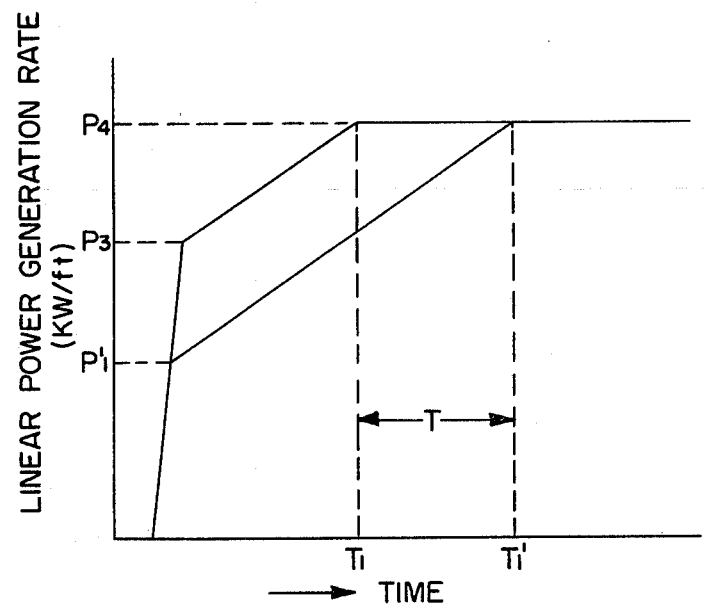
FIG. 3 is a diagram showing a relation of a linear heat generation rate to time.

Referring to FIG. 3, showing a relation between linear heat generation rate and time, assuming that the maximum linear heat generation rate of the fuel elements that the reactor can raise its power is $P_3$ kw/ft, the control rod can be withdrawn freely to raise the reactor power until the linear heat generation rate reaches $P_3$. When beyond $P_3$, the reactor power is raised by controlling the recirculating coolant in the coolant recirculation system 6 to the rated power $P_4$ of the reactor according to the electric power demand.

If the reactor can not raise its power by the control rods withdrawal only to $P_1'$, the load following operation time is lost by the maximum time T ($T_1' - T_3$), computed with the above-mentioned operation, that is, the load following operation may be not effected for the time T.

According to the method of operating a nuclear reactor of the present invention, a range of power increase by the withdrawal of the control rod is extended more than a conventional method. This extended range decreases a range of the power increased by controlling the coolant in the recirculation system, which shortens the time of the preconditioning operation which is often repeated. Therefore, according to the method of the invention it is apparent that load following performance higher than the conventional method is brought into the reactor without failure risk of the fuel element.

What is claimed is:

1. A method of operating a nuclear reactor which comprises a plurality of fuel elements each having a cladding and fuel pellets stacked in the cladding therein, control rods, and recirculation system for cooling the core by recirculation of coolant, comprising the steps of detecting burnup of the fuel element; determining the upper limit of a linear heat generation rate of the fuel element at which the reactor can raise its power by the withdrawal of the control rod, referring to the burnup detected and an amount of the diametral gap between the cladding and the pellets; and withdrawing the control rod to raise the power of the reactor within the upper limit of the linear heat generating rate.

2. A method of operating a nuclear reactor which comprises nuclear fuel elements inserted in a core, control rods and a recirculation system, comprising the steps of raising power of the reactor by withdrawal of the control rods up to a linear heat generation rate $P_0$ at which pellet-cladding interaction starts to occur at least once in a range of the burnup of fuel element in which the linear heat generating rate increases to the linear heat generating rate $P_0$ according to the burnup increasing; and controlling the recirculation system to raise the power of the reactor after the linear heat generation rate of the fuel element has reached the linear heat generation rate $P_0$ at which the pellet-cladding interaction starts to occur, and in which the linear heat generation rate $P_0$ (kw/ft) is given by the following equation:

$$P_0 = -100G^2 + 70G + 3,$$

wherein G (mm) is a diametral gap between a cladding and pellets in the fuel element.

3. A method of operating a nuclear reactor which comprises nuclear fuel elements inserted in a core, control rods and a recirculation system, comprising the steps of raising power of the reactor by withdrawal of the control rods up to a linear heat generation rate $P_0$ at which pellet-cladding interaction starts to occur at least once in a range of the burnup of the fuel element in which the linear heat generating rate increases to the linear heat generating rate $P_0$ according to the burnup increasing; and controlling the recirculation system to raise the power of the reactor after the linear heat generation rate of the fuel element has reached the linear heat generation rate $P_0$ at which the pellet-cladding interaction starts to occur, and wherein an increase of the power of the reactor by the withdrawal of the control rods in a range above the burnup of the fuel element corresponding to the linear heat generation rate $P_0$ of the fuel element is effected below the value P which is given by the following equation:

$$P = 9 + (P_0 - 9) \exp\{-0.4 \times (B - B_0)\}$$

wherein $P_0$ *is the linear heat generation rate given by the following equation:*

$$P_0 = -100G^2 + 70G + 3$$

G (mm) is a diametral gap between a cladding and pellets in the fuel element, B (GWD/T) is the burnup of the fuel element, and $B_0$ (GWD/T) is the burnup of the fuel element corresponding to the linear heat generation rate $P_0$ and given by the following equation:

$$B_0 = -25G^2 + 17.5G.$$

4. In a nuclear reactor comprising a plurality of fuel elements each having a cladding and a plurality of fuel pellets stacked in the cladding, control rods and a recirculation system for cooling the nuclear core by recirculating a coolant, a method of operating the nuclear reactor comprising the steps of:
  detecting burnup of the fuel elements;
  determining the upper limit of a linear heat generation rate of the fuel element, within which the power of the reactor can be raised by the withdrawal of the control rods, referring to the burnup detected and an amount of the diametral gap between the cladding and the pellets; and
  withdrawing the control rods to raise the power of the reactor in accordance with the determined upper limit.

5. The method of operating the nuclear reactor as defined in claim 4, wherein the upper limit of the linear heat generation rate in the burnup range of an initial stage, in which the power of the reactor at the onset of pellet-cladding interaction increases according to the burnup increasing, is given by the following equation:

$$P_0 = -100G^2 + 70G + 3,$$

wherein G (mm) is the diametral gap between the cladding and the fuel pellets.

6. The method of operating the nuclear reactor as defined in claim 4, wherein an increase of power of the reactor by the withdrawal of the control rods in a range above the burnup of the fuel element corresponding to the maximum linear heat generation rate of the fuel element is effected below the value P which is given by the following equation:

$$P = 9 + (P_0 - 9) \exp\{-0.4 \times (B - B_0)\},$$

wherein B (GWD/T) is the burnup of the fuel element, and $B_0$ (GWD/T) is the burnup of the fuel element corresponding to the maximum linear heat generation rate and given by the following equation:

$$B_0 = -25G^2 + 17.5G.$$

* * * * *